United States Patent Office 3,313,812
Patented Apr. 11, 1967

3,313,812
PREPARATION OF TRIS-HYDROXYALKYL-
ISOCYANURATES
John W. Churchill, Mount Carmel, and Robert C. East, Hamden, Conn., assignors to Olin Mathieson Chemical Corporation, a corporation of Virginia
No Drawing. Filed Oct. 28, 1963, Ser. No. 319,588
6 Claims. (Cl. 260—248)

This invention relates to a method of preparing tris-2-hydroxyalkyl isocyanurate. More specifically, this invention relates to a method for preparing tris-2-hydroxyalkyl isocyanurate by reacting cyanuric acid and an alkylene oxide. The tris-2-hydroxyalkyl isocyanurate of this invention may be represented graphically by the following formula:

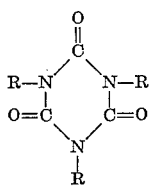

where R represents a hydroxyalkyl radical containing at least 2 carbon atoms and preferably 2 to 7 carbon atoms.

According to the present invention, the tris-2-hydroxyalkyl isocyanurate can readily be produced in high yields by reacting cyanuric acid with an alkylene oxide, preferably containing 2 to 7 carbon atoms, at a temperature of about 50° to about 250° C.

In the process of the invention, cyanuric acid and the alkylene oxide react together while in admixture with a quantity of the tris-2-hydroxyalkyl isocyanurate.

In one process described in the literature, tris-2-hydroxyalkyl isocyanurates are prepared by reaction of an alkylene oxide with cyanuric acid in the presence of an inert solvent such as a lower dialkyl formamide, N-alkyl morpholine, N-alkyl oxazolidinone, dimethyl sulfoxide, formamide and diethyl carbonate, and in the presence of an alkaline catalyst such as sodium hydroxide, calcium hydroxide, sodium carbonate, tetramethyl ammonium hydroxide, etc. With the novel process of this invention a catalyst is not required, and, in addition, there is no problem of recovering, in a separate operation, an expensive solvent. An additional advantage of the present process over the art is that the process of this invention can be operated in a continuous manner to give consistently high yields of the desired product.

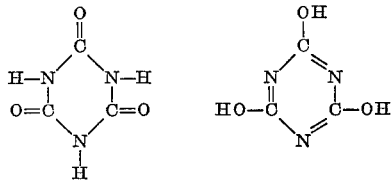

Isocyanuric acid     Normal cyanuric acid

In the preferred operation, tris-2-hydroxyalkyl isocyanurates are prepared by reaction of cyanuric acid and an alkylene oxide selected from the group consisting of ethylene oxide, propylene oxide, and butylene oxide in molecular ratios of at least 3 moles of alkylene oxide per mole of cyanuric acid. The process of this invention can be carried out using about 2 to 4 moles of alkylene oxide per mole of cyanuric acid. Use of the preferred mole ratio results in maximum yields of tris-2-hydroxy alkyl isocyanurates of high purity.

The alkylene oxide may be added as a gas or as a liquid. Under certain reaction conditions a part of the alkylene oxide may be distilled from the reaction mixture, and, in such cases, may be required to complete the reaction.

As previously pointed out, the reaction of cyanuric acid and the alkylene oxide is carried out at a temperature of approximately 50° to approximtaely 250° C., and preferably from about 120° C. to about 180° C. Further, when reaction temperatures above 250° C. are used, decomposition of the product occurs resulting in substantially reduced yields. It is convenient to use atmospheric pressure, however, pressures varying from subatmospheric up to 100 atmospheres or more may be employed. Since alkylene oxides are more readily soluble in reaction mixtures at elevated pressures, it is preferable to operate at a pressure between atmospheric pressure and about 10 atmospheres. The reaction generally will vary from about 1 hour to about 40 hours or more depending on the particular reaction conditions employed. The required time decreases as the reaction temperature is increased.

Example I

An amount of 96 grams of tris-2-hydroxyethyl isocyanurate was heated to a temperature of 120° C. in a reaction vessel equipped with a stirrer, thermometer, and Dry Ice reflux condenser. 83.7 grams of cyanuric acid was added with vigorous stirring. Gaseous ethylene oxide (71.3 grams) was introduced over a period of 17 hours. The average rate of addition was about 0.10 mole per hour. In the next step an additional 120 grams of cyanuric acid was introduced and the reaction was continued for about 11 hours. During this last-mentioned period, a total of 142 grams of ethylene oxide was added at the rate of about 0.25 mole per hour while the reaction mixture was maintained at 120° C. Crude product in the amount of 513 grams was obtained. The acid number of the product was 7.14 and its melting range was 118° C. to 130° C. By infrared analysis the product was identified as tris-2-hydroxyethyl isocyanurate and it was shown by the same method that no 2-oxazolidinone was present.

Example II

To 94.4 grams of tris-2-hydroxyethyl isocyanurate heated to 170° C. there were added 50 grams of cyanuric acid. Then the introduction of ethylene oxide was commenced at an average rate of 1.0 mole per hour. After 1½ hours, 100 grams of cyanuric acid was added. At the end of three hours the theoretical quantity of ethylene oxide had been added and the addition of the oxide was terminated. Crude product in an amount of 403.8 grams was obtained. This material exhibited an acid number of 8.3 and the melting range was 112° C. to 126° C. No oxalidinone was detected by infrared analysis in this compound. Prior to recrystallization the yield of product was quantitative. After recrystallization from ethanol pure tris-2-hydroxyethyl isocyanurate was obtained having a melting range of 134° C. to 135° C. The product was also analyzed by infrared methods and shown to be tris-2-hydroxyethyl isocyanurate.

The relative amount of the tris-2-hydroxyalkyl isocyanurate in admixture with the reactants can be varied widely, however, the weight of isocyanurate should be not less than 50 percent of the weight of the cyanuric acid employed and preferably the ratio of the weight of the tris-2-hydroxyalkyl isocyanurate to the weight of the cyanuric acid is within the range of from about 0.5:1 to about 5:1.

In carrying out the process of this invention it is recommended that the reaction mixture be maintained in acidic condition in order to avoid dissociation of the product to the corresponding 2-oxazolidinone.

What is claimed is:
1. A method for the preparation of a tris-hydroxy- alkyl-isocyanurate which consists of heating together cyanuric acid and an alkylene oxide selected from the group consisting of ethylene oxide, propylene oxide and butylene oxide while the reactants are in admixture with the tris-hydroxyalkyl-isocyanurate.

2. The method of claim 1 wherein the said alkylene oxide is ethylene oxide.

3. The method of claim 1 wherein from about 2 to about 4 moles of the alkylene oxide are heated with each mole of cyanuric acid.

4. The method of claim 1 wherein a temperature of from about 50° C. to about 250° C. is employed.

5. The method of claim 1 wherein the amount of the tris-hydroxyalkyl-isocyanurate in admixture with the said reactants in weight amount is not less than 50 percent by weight of the weight of the cyanuric acid employed.

6. The method for the preparation of tris-2-hydroxyethyl isocyanurate which consists of heating together at a temperature of from about 120° C. to about 250° C. at least 3 moles of ethylene oxide and 1 mole of cyanuric acid while the reactants are in admixture with tris-2-hydroxyethyl isocyanurate in an amount not less than 50 percent by weight of the weight of the cyanuric acid employed.

References Cited by the Examiner

UNITED STATES PATENTS

| | | |
|---|---|---|
| 2,381,121 | 8/1945 | Ericks _____ 260—248 X |
| 2,414,289 | 1/1947 | Ericks _____ 260—248 X |
| 2,716,137 | 8/1955 | Patton _____ 260—248 |
| 3,088,948 | 5/1963 | Little et al. _____ 260—248 X |

OTHER REFERENCES

Eastham et al.: Canadian Jour. Chem., vol. 29 (1951), pp. 575–85.

Yurev et al.: Referat. Zhur. Khim. (1953), No. 8488, available through C.A., 50 4940h–41.

WALTER A. MODANCE, *Primary Examiner.*

J. M. FORD, *Assistant Examiner.*